Dec. 15, 1964    G. E. BONIN    3,160,994
METHOD AND APPARATUS FOR MACHINING LIP
EDGE PORTIONS OF A VESSEL
Filed May 20, 1963    2 Sheets-Sheet 1

INVENTOR.
George E. Bonin

BY Clarence R. Patty, Jr.

ATTORNEY

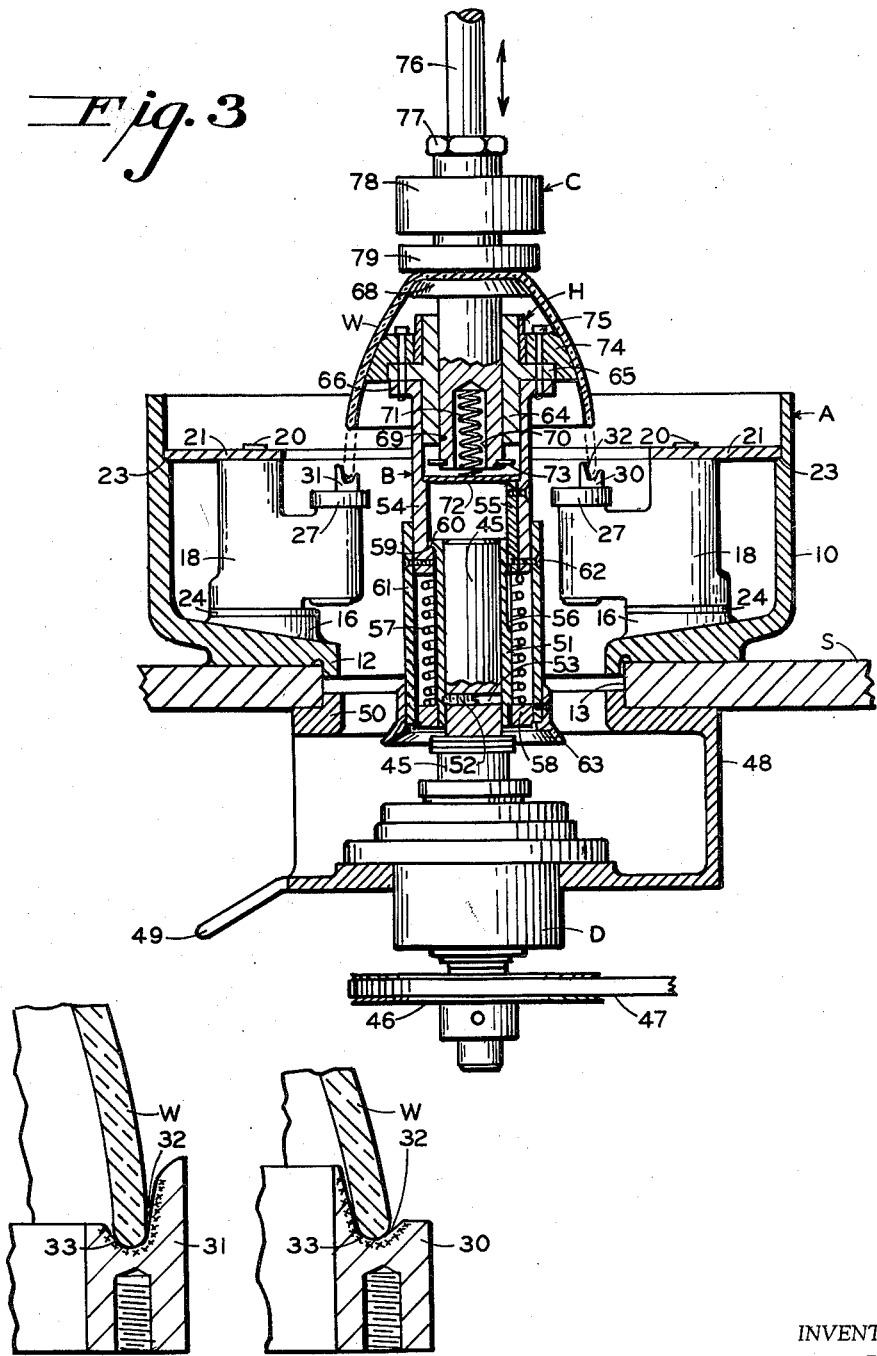

3,160,994
METHOD AND APPARATUS FOR MACHINING LIP EDGE PORTIONS OF A VESSEL
George E. Bonin, Addison, N.Y., assignor to Corning Glass Works, Corning, N.Y., a corporation of New York
Filed May 20, 1963, Ser. No. 281,562
6 Claims. (Cl. 51—161)

This invention relates to the machining or honing of edge portions of a workpiece, and more particularly to the method of and apparatus for finishing lip-edge portions of cup-shaped glass-like articles to form smooth rounded edges thereon.

Most commercial machinery utilized in the production of glass articles has a tendency to form parting lines, flashing, ridges and the like about peripheral portions of the article, which must be removed before the article may be utilized. In the past, it has been customary to remove such parting lines and finish peripheral or lip-edge surfaces of glass articles by conventional fire-polishing methods. The ware is usually fire-polished immediately after formation to take advantage of the residual heat of formation, and in many instances is fire-polished while being retained by a mold part utilized in its manufacture.

Although this known expedient is generally satisfactory for finishing edge surfaces of most glass articles, it is completely unsatisfactory for finishing the surfaces of articles manufactured from the recently developed class of materials known as glass-ceramics. In the manufacture of articles from this latter class of materials, the articles as first formed, such as by conventional glass-forming methods, possess glass-like characteristics. However, such articles are subsequently subjected to the application of controlled heat to devitrify and convert the glasseous structure into a semicrystalline or ceramic-like structure. Accordingly, if fire-polishing techniques were to be utilized to remove parting lines, flashing, and the like, from the initially formed articles produced in manufacturing glass-ceramics, the heat produced during the fire-polish would tend to partially ceram or devitrify a localized area of the initially formed glass-like articles, resulting in subsequent structural failure and breakage during the regular ceramming or crystallizing process.

Further, even if it were possible to fire-polish the initially formed articles, without detrimentally affecting their ultimate structural qualities, fire-polishing has the additional disadvantage of producing a beaded edge on the ware which makes it virtually impossible to provide the ware with a uniform glazing. The beaded edge produces low surface tension therealong, and accordingly, only an extremely thin coat of glazing adheres to the beaded portion, thus resulting in an unattractive finished product. In addition, once the article has been subjected to the ceramming or crystallizing process to convert it into a glass-ceramic, it would be impossible to remove a fin or parting line by fire-polishing unless the temperature utilized was above liquidus; however, the use of such a temperature would set up such a high degree of internal stresses as to produce chipping and structural failure in the ware.

Therefore, realizing the fact that conventional fire-polishing methods could not feasibly be utilized to finish edge portions of articles formed of glass-ceramic materials, I set forth to devise a novel method and apparatus which would not only obviate and solve this finishing problem peculiar to glass-ceramics, but which would also be economically feasible from a commercial standpoint. When forming cup-shaped articles such as are utilized in tableware, it is necessary to remove parting lines or flashing which is usually formed about a peripheral or lip edge thereof.

It became apparent that if parting lines and the like were to be removed from the lip-edge of a cup-shaped article and such edge portions provided with a smoothly rounded surface by machining, two main obstacles had to be overcome. The first problem resided in the fact that when a rounded surface, other than a half-round, is machined or ground by an abrasive member, an edge is inherently produced on the rounded surface at the point of termination of contact with the abrasive means, thus producing an undesirable ridged condition. The second obstacle related to the fact that although the outer lip periphery of such cup-shaped articles to be finished may be substantially circular, even a slight out-of-roundness tends to produce uneven grinding when the peripheral edge portions to be surfaced are continuously presented in the usual rigid or fixed relationship to the abrasive member.

A preferred embodiment of the present invention set forth and described in detail hereinafter, in its simplest form comprises a hone-holder assembly having a plurality of curvilinear inside and outside hones flexibly or resiliently mounted to conform to the general configuration of the peripheral lip to be ground; a rotatable ware chuck assembly, positioned centrally of the hone holder assembly, having a drive unit secured thereto for rotating a ware piece mounted upon such chuck assembly; and a reciprocable ware hold-down assembly having a rotatable hold-down pad on an end thereof before engaging a ware piece mounted on the chuck assembly and urging such piece, while rotatably driven, into cooperable engagement with the flexibly mounted inside and outside hones of the hone holder assembly under a predetermined pressure, and in such a manner so that the hones may fluctuate with respect to the workpiece to compensate out-of-roundness which may be present in the other periphery forming the lip edge of the cup-shaped ware.

In carrying out the invention to accomplish the desired improved result obtainable with my novel advancement in the art, the invention includes the positioning of a plurality of curvilinear hones about a common circle having substantially the same diameter as that of the peripheral lip edge of the ware to be ground, the positioning of a workpiece on a rotatable ware chuck, the clamping of such workpiece on the rotatable chuck, the rotation of such chuck having the workpiece clamped thereon, the urging of the peripheral lip edge of such workpiece into engagement with the plurality of circularly aligned hones, the application of water to the area being finished and the removal thereof from such area, the fluctuating of the hones within predetermined tolerances to compensate for out-of-roundness of the peripheral lip portion being ground or finished, and the removal of the finished workpiece from the chuck.

The preferred embodiment of my invention includes the utilization of alternately positioned inside and outside hones having a concave groove formed therein which is curvilinear to complement the periphery of the lip edge. The groove has a width greater than the thickness of the peripheral edge of the workpiece being machines, so that a major portion of the inside to outside arcuate surface of the lip edge is machined by each hone as the workpiece is rotated, thus producing an overlapping of the machining by the adjacent hones to thereby avoid the possibility of forming grinding ridges. Such overlapping of machining is necessary to avoid the formation of such ridges where the cross-sectional curvature of the outer periphery or lip surface to be finished is not formed with a single radius such as a half-round, and accordingly the utilization of only inside or only outside grooved hones could not contact the entire curvature of the surface so as to provide a smooth finish.

The peripheral lip edge of the rotating workpiece being finished is maintained in constant contact with the circularly or arcuately aligned inside and outside hones, and although the hones are held in position by a resilient means, they are pivotally mounted and free to fluctuate with respect to the peripheral edge of the rotating workpiece to compensate for out-of-roundness which may be present in such lip edge. Such resilient suspension obviates the possibility of overloading certain of the plurality of hones or producing excessive and uneven grinding or finishing in certain peripheral portions of an out-of-round workpiece, which would otherwise be experienced if the hones were held in a rigid or fixed position during machining.

It thus has been an object of my invention to obviate the problems heretofore encountered in removing parting lines and the like from articles formed of glass-ceramic materials.

A further object of my invention has been to provide a method of and means for finishing peripheral lip edges of glass-like articles which cannot feasibly be fire-polished without detrimentally affecting the ultimate physical characteristics thereof.

An additional object of my invention has been to provide improved apparatus for uniformly grinding or honing peripheral lip edge portions of articles which may be slightly out-of-round, wherein the peripheral lip edge portions of the article are rotated in contact with a plurality of circularly aligned curvilinearly grooved hones, which are flexibly or resiliently mounted to permit fluctuation with respect to the peripheral edge portions to compensate for out-of-roundness which may be present.

A still further object of my invention has been to provide an improved apparatus for smoothly rounding peripheral lip edge portions of cup-shaped articles, wherein the apparatus has easily interchangeable ware chuck retaining heads and adjustable hone-mounting arms to facilitate the peripheral lip edge finishing of a plurality of cup-shaped articles having various sizes and shapes.

These and other objects of my invention will be apparent to those skilled in the art from the following disclosure and accompanying drawings in which:

FIG. 3 is an elevational view in section of a finishing apparatus or edge honing tool embodying my invention;

FIG. 4 is an enlarged fragmental view in section illustrating the contact between an outside hone and one form of cup-shaped article which may be ground; and, FIG. 5 is an enlarged fragmental view in section illustrating the contact between an inside hone and the peripheral lip edge of another form of cup-shaped article which may be ground or finished.

Figure 1:
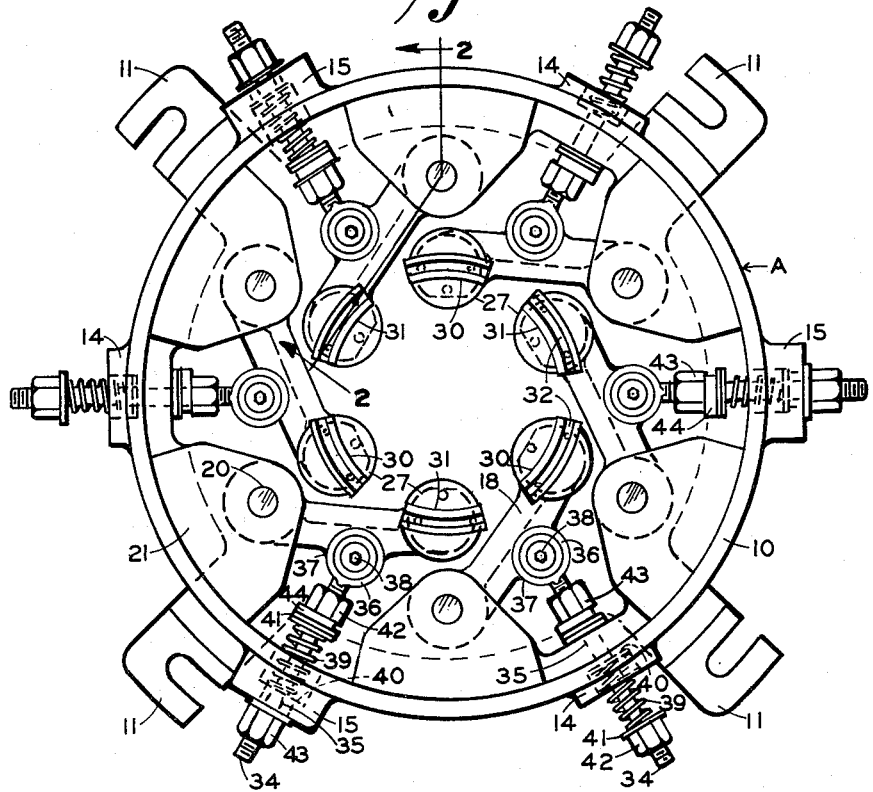
FIG. 1 is a top plan view of a hone holder assembly incorporated within my invention.

As shown in the drawings, the apparatus is composed of three main parts including a hone holder assembly designated as A, a ware chuck or workpiece retaining assembly designated as B, and a ware hold-down assembly designated as C. The ware chuck assembly B is shown in FIG. 3 having a removable ware-retaining head assembly H at its upper end, for retaining a ware article or workpiece W to be finished, and a drive unit D at its lower end for rotating the ware chuck assembly and accordingly the workpiece or ware W mounted thereon. The entire unit is mountable on a suitable platform or support S which may be a rotating table having a plurality of such units spaced arcuately thereabout.

Figure 2:
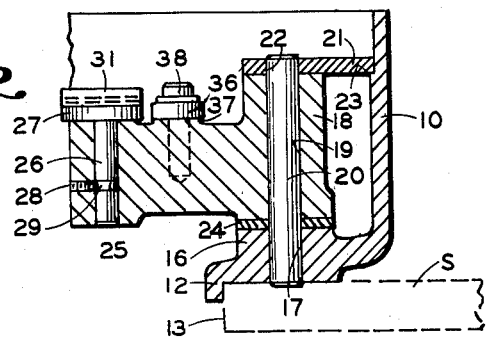
FIG. 2 is a fragmental elevational view in section of a portion of the hone holder assembly taken along lines 2—2 of FIG. 1.

Referring now to FIGS. 1 and 2, the hone holder assembly A is shown comprising a cylindrical housing 10 having a plurality of radially-extending mounting lugs 11 for securing the same to the support S, and an annular lip flange 12 for projecting downwardly within an opening 13 formed in the support S. A plurality of bosses 14 and 15 are alternately formed about the wall of the cylindrical housing 10 for mounting resilient means to flexibly or resiliently position inside and outside hones, respectively, as hereinafter described.

A plurality of mounting arm bosses 16 are formed arcuately about the bottom of the cylindrical housing 10 and having a bore 17 extending therethrough. A hone-mounting arm 18, having a bore 19 at its outer end, is pivotally mounted on each of the bosses 16 by means of a pivot pin 20 extending through the bore 19 in arm 18 and bore 17 in boss 16. The upper end of pivot pin 20 is retained in position by a mounting cap or plate 21 having a bore 22 through which the pin 20 extends. The plate 21 engages a radial ledge 23 formed in the inner surface of the side wall of cylindrical housing 10 and may be secured to such side wall by any suitable means such as by bolting to flanged portions (not shown) extending inwardly from such walls. A bearing washer 24 may be positioned between the boss 16 and mounting arm 18.

Each of the hone-mounting arms 18 has a bore 25 extending therethrough adjacent its inner end for receiving a hone adapter pin 26 having a hone adapter plate 27 formed thereon. A spring loaded detent set screw 28 cooperably engages a recessed portion 29 formed in the pin 26 for releasably retaining such pin in position within the bore 25. A curvilinear edge-finishing hone is mounted on each adapter plate 27 in such a manner so that an inside hone 30 and an outside hone 31 are alternately positioned in arcuate relationship on adjacent adapter plates. Each hone is provided with a contoured groove 32, having an abrasive surface 33, for smoothly rounding the lip edge of a ware piece to be finished. The longitudinal extent of groove 32 is formed with an arcuate configuration having a radius substantially equal to the radius of the lip edge periphery to be finished.

Each of the pivotally mounted hone-mounting arms 18 is resiliently retained in a predetermined or pre-adjusted position so that the various inside and outside hones mounted thereon lie on a circle having substantially the same radius as that of the periphery of the lip edge being finished. The arms are pivotable, however, to permit the hones to fluctuate from such circle to compensate for out-of-roundness which may be present in such periphery. The positioning means for each hone mounting arm is substantially identical, except for the fact that for those arms having an inside hone 30 mounted thereon, resilient means is positioned exteriorily of the housing 10 and abuts a spring seat in a boss 14; whereas for those arms having an outside hone 31 mounted thereon, resilient means is positioned within the housing 10 and abuts a spring seat within a boss 15. However, in view of the fact that the remaining structure of the various positioning means is substantially identical, whether it be for a hone mounting arm having an inside or outside hone mounted thereon, a detailed description of one such positioning means will suffice for all.

As shown particularly in FIGURE 1, the positioning means comprises an eye bolt 34 extending through a bore 35 formed in a bossed portion 14 or 15. The eye 36 of the bolt 34 is secured to a central bulbous portion 37 of mounting arm 18 by any suitable means such as a shoulder bolt 38. A spring 39 is positioned about the eye bolt 34 and at one end abuts a spring seat 40 formed in a bossed portion 14 or 15, and at the opposite end abuts against a spring stop abutment washer 41, the position of which is determined by a compression adjustment nut 42.

A stop adjustment nut 43 is positioned on the eye bolt adjacent the end opposite that having the compression adjustment nut mounted thereon, to limit the direction of movement urged by spring 39, and thus initially preset the position of hone mounting arm 18 and accordingly the hone mounted thereon. However, this preset position of the hone may be varied by forces acting against the compression spring, such as may be exerted on a hone by an out-of-round article being machine. If desired, a spacer yoke 44 may be positioned adjacent either the compression adjustment nut 42 or the stop adjustment nut 43. It thus can be seen, that the preselected positionment of the inside and outside hones may be varied to accommodate a variety of workpieces having peripheral lip edges of different diameters, by preadjusting the positionment of nut 42, 43 and spacer yoke 44 to place the hones 30, 31 in position along a circle having the desired diameter.

Referring now to the ware chuck assembly B shown in FIGURE 3, a drive shaft 45 extends upwardly through opening 13 in support S and projects into housing 10 centrally of the circularly mounted edge-finishing hones 30, 31. The drive shaft 45 forms a part of and is rotatably driven by the drive unit D. A sheave or pulley 46, also forming a part of drive unit D, is connected to a conventional motor or other prime mover (not shown) by any suitable means such as a belt 47, for imparting rotation to the drive shaft 45. The drive unit D is shown mounted through the bottom of a water box 48, having an outlet trough 49, and an upper annular rim 50 projecting within the opening 13 of the support S. The water box 48 may be secured to the under surface of the support S by any suitable means.

A drive shaft bushing 51 surrounds drive shaft 45, and is retained in position thereon by a detent 52 positioned within a bore 53 extending through the shaft. A ware support column 54, having a key 55 secured thereto and slidable within a keyway 56 formed in the drive shaft bushing 51, is operatively mounted upon such bushing for axial movement relative thereto and rotationable movement synchronous therewith. A compression spring 57 surrounds the bushing 51, and at one end abuts the lower end of the ware support column 54 urging such column upwardly, and at its opposite end abuts a ware retaining ring 58 mounted on the lower end of bushing 51. The ware support column 54 is limited in its upward movement by an inwardly projecting stop abutment flange 59, formed on the lower end thereof, which engages an outwardly extending projection 60, formed at the upper end of bushing 51. A spring housing 61 surrounds the spring 57 and is secured to the ware support column 54 by screws 62. A water slinger 63 is secured to the housing 61 to disperse spent water used in the grinding operation about the water box 48.

A ware retaining head assembly H is removably secured to the ware support column 54. The head assembly H has a spindle drive shaft 64 which partially telescopes within the upper end of ware support column 54. Outwardly extending flange portions 65 formed on shaft 64 mate with and rest upon flange portions 66, formed adjacent the upper end of support column 54. A plunger or chuck spindle 67, having a head 68, is slidably positioned within a bore 69 formed in the spindle drive shaft 64. A cylindrical recess 70, formed in the bottom of chuck spindle 67, houses a compression spring 71, which at its upper extent abuts the end of cylindrical recess 70 and at its lower end abuts a spring seat 72 retained by the ware support column 54. The compression spring 71 urges the chuck spindle 67 and accordingly a ware article W mounted thereon upwardly, however, its upward movement is limited by a retainer ring 73 secured to the spindle 67 which abuts the lower end of spindle drive shaft 64.

A contoured plug 74 of flexible or resilient material, shaped to compliment the contour of the interior surface of the ware piece W, is positioned about the spindle drive shaft 64. Cap screws or retaining pins 75 extend through the plug 74 and the flange 65 of spindle drive shaft 64, and are secured to the flange 66 of the ware support column 54. Accordingly, a plurality of interchangeable head assemblies H may be alternately releasably secured to the ware support column 54, by means of cap screws 75, to accommodate various sizes and shapes of ware articles W to be finished.

The ware hold down assembly C comprises an axially reciprocable rod 76, which may be actuated by a conventional hydraulic or pneumatic piston and cylinder arrangement, secured to a bearing housing 78 by means of a mounting stud nut 77. A freely rotatable hold down pad 79, adapted to engage a ware article W positioned on head assembly H, is dependently supported by the bearing housing 78 for rotation about the axis of shaft 45.

It thus can be seen that in carrying out my inventive concept, a plurality of inside and outside hones, having a grooved arcuate abrasive surface, are resiliently positioned alternately about a circle having substantially the same diameter as the periphery of the lip edge to be finished; and a cup-shaped ware article to be finished is placed in an inverted position upon a suitable preselected support or retaining head designed to receive and snugly retain such a ware article. An axially reciprocable plunger or rod having a freely rotatable end portion moves downwardly to engage the uppermost surface of the inverted ware article and urge it downwardly against the action of a first resilient means into snug relationship with the retaining head.

A ware chuck assembly, upon which the retaining head is mounted, is positioned centrally or axially of the circularly-aligned arcuate hones, and rotated about an axis co-axial with the circularly-aligned hones and the axis of rotation of the end portion of the reciprocable plunger, to rotate the ware article about a co-extensive axis which extends normal to a plane formed by the circular outer peripheral lip edge. The plunger continues its downward movement during such rotation against the force exerted by a second resilient means to position and retain the edge to be finished in engagement with the contoured arcuate groove of the circularly positioned hones. Water is preferably supplied to the grinding area, and may be removed therefrom by gravity and dispersed into a collecting chamber for final removal.

Inside and outside hones which overlap edge portions of the lip are utilized to smoothly round the lip edge being finished, and are mounted upon resiliently positioned pivotal mounting arms which are free to fluctuate so as to conform to out-of-roundness which may be present in the periphery being ground. When the edge has been finished, the water is turned off, the rotation stopped, and the plunger retracted axially upwardly. Upon the release of the downward pressure exerted by the plunger, the second resilient means urges the cup-shaped article upwardly out of engagement with the hones, and the first resilient means lifts the article upwardly from the snug engagement with the retaining head so that it may be easily removed therefrom and another positioned thereon.

Although I have disclosed the now preferred embodiment of my invention it will be apparent to those skilled in the art that various changes and modifications may be made thereto without departing from the spirit and scope thereof as defined in the appended claims.

What is claimed is:

1. Apparatus for machining edge portions of cup-shaped articles to form smoothly rounded lip edges on the outer periphery thereof comprising, a rotatable chuck assembly for rotating a cup-shaped article about an axis substantially perpendicular to a plane formed by the peripheral lip edge thereof, a plurality of independently mounted edge finishing hones positioned equally distant from the axis of rotation about a circle having a diameter substantially equal to the diameter of the outer periphery of the cup-shaped article to be ground, an arcuately-extending contoured groove formed in each of said edge finishing hones having a radius substantially equal to the radius of said circle to complimentarily receive the peripheral lip edge portion to be ground, pivotal mounting arms for supporting each of said edge finishing hones, and resilient means for flexibly positioning said arms so that said edge finishing hones may fluctuate perpendicular to said axis of rotation to compensate for out-of-roundness which may be present in the outer periphery being ground.

2. Improved apparatus as defined in claim 1 wherein inside and outside edge finishing hones are alternately positioned on said mounting arms about a circle concentric with the axis of rotation, and said contoured grooves formed in the alternately positioned hones having overlapping grinding surfaces so as to provide a smoothly rounded ridge-free lip edge on the cup-shaped article.

3. Apparatus for finishing peripheral lip edge portions of cup-shaped articles and the like which comprises, a ware chuck assembly having a removable ware retaining head for receiving a cup-shaped article to be finished, means for rotating said chuck assembly and a cup-shaped article positioned upon said ware retaining head about an axis substantially perpendicular to a plane passing through the peripheral edge portion to be ground, a plurality of abrasive bodies positioned about a circle coaxial with said axis of rotation and having a diameter substantially equal to the diameter of the peripheral edge to be finished, each of said abrasive bodies provided with a curvilinear groove having a radius substantially equal to the radius of said circle and complimenting said circle to receive the peripheral edge portion to be ground, hold down means for initially urging the cup-shaped article into snug engagement with said ware head assembly and for urging the peripheral lip edge portion thereof into engagement with said abrasive means, first resilient means for urging the peripheral lip edge portions of the cup-shaped article out of engagement with said abrasive means upon the withdrawal of said hold down means, and second resilient means for releasing the cup-shaped article from snug relationship with said ware head assembly.

4. Improved apparatus as defined in claim 3 wherein said hold down assembly is reciprocal along and rotatable about the axis of rotation of said chuck assembly.

5. Apparatus as defined in claim 3, wherein said ware retaining head assembly is interchangeable and said abrasive bodies are pivotally mounted so as to accommodate various sized cup-shaped articles.

6. A method of finishing rounded peripheral lip edge portions of cup-shaped articles and the like which comprises, rotating a cup-shaped article about an axis extending substantially normal to and centrally of a plane formed by the circular peripheral edge of such cup-shaped article, moving peripheral lip edge portions of the rotating cup-shaped article along the axis of rotation into contact with a plurality of arcuately-extending concave grooves positioned about and having a radius equal to that of a circle coaxial with the axis of rotation, permitting such arcuately-extending grooves to fluctuate solely transversely of the axis of rotation to compensate for out-of-roundness which may be present in the peripheral edge of the cup-shaped article, and simultaneously finishing inside and outside edge portions of such periphery while overlappingly finishing central portions thereof to provide a smoothly rounded peripheral lip of said cup-shaped article.

References Cited in the file of this patent

UNITED STATES PATENTS

| 1,688,424 | Kiefer | Oct. 23, 1928 |
| 2,612,729 | Walley et al. | Oct. 7, 1952 |

FOREIGN PATENTS

| 756,341 | Great Britain | Sept. 5, 1956 |
| 1,159,837 | France | Feb. 17, 1958 |